(12) United States Patent
Krishnan et al.

(10) Patent No.: US 10,572,425 B2
(45) Date of Patent: *Feb. 25, 2020

(54) PCIE LANE AGGREGATION OVER A HIGH SPEED LINK

(71) Applicant: INPHI CORPORATION, Santa Clara, CA (US)

(72) Inventors: Sreenivas Krishnan, Campbell, CA (US); Nirmal Raj Saxena, Los Altos, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/267,748

(22) Filed: Feb. 5, 2019

(65) Prior Publication Data

US 2019/0171605 A1 Jun. 6, 2019

Related U.S. Application Data

(63) Continuation of application No. 15/812,493, filed on Nov. 14, 2017, now Pat. No. 10,235,318, which is a (Continued)

(51) Int. Cl.
*G06F 13/40* (2006.01)
*H04L 12/64* (2006.01)
(Continued)

(52) U.S. Cl.
CPC ...... *G06F 13/4022* (2013.01); *G06F 13/4027* (2013.01); *G06F 13/4282* (2013.01);
(Continued)

(58) Field of Classification Search
CPC .. G06F 13/40; G06F 13/4022; G06F 13/4282; H04J 14/0267; H04L 12/64;
(Continued)

(56) References Cited

U.S. PATENT DOCUMENTS 9,430,437 B1 * 8/2016 Krishnan ............ G06F 13/4027
9,846,669 B2 * 12/2017 Krishnan ............ G06F 13/4027
10,235,318 B2 * 3/2019 Krishnan ............ G06F 13/4027

* cited by examiner

*Primary Examiner* — Glenn A. Auve
(74) *Attorney, Agent, or Firm* — Richard T. Ogawa; Ogawa P.C.

(57) ABSTRACT

A method of operating a computer network system configured with disaggregated inputs/outputs. This system can be configured in a leaf-spine architecture and include a router coupled to a network source, a plurality of core switches coupled to the router, a plurality of aggregator switches coupled to each of the plurality of core switches, and a plurality of rack modules coupled to each of the plurality of aggregator switches. Each of rack modules can include an I/O appliance with a downstream aggregator module, a plurality of server devices each with PCIe interfaces, and an upstream aggregator module that aggregates each of the PCIe interfaces. A high-speed link can be configured between the downstream and upstream aggregator modules via aggregation of many serial lanes to provide reliable high speed bit stream transport over long distances, which allows for better utilization of resources and scalability of memory capacity independent of the server count.

20 Claims, 13 Drawing Sheets

Related U.S. Application Data continuation of application No. 15/223,412, filed on Jul. 29, 2016, now Pat. No. 9,846,669, which is a continuation of application No. 13/963,329, filed on Aug. 9, 2013, now Pat. No. 9,430,437.

(51) Int. Cl.

| | | |
|---|---|---|
| *H04L 12/66* | (2006.01) | |
| *H04Q 11/00* | (2006.01) | |
| *G06F 13/42* | (2006.01) | |
| *H04B 10/27* | (2013.01) | |
| *H04J 14/02* | (2006.01) | |
| *H04L 12/933* | (2013.01) | |

(52) U.S. Cl.
CPC ............ *H04B 10/27* (2013.01); *H04L 12/64* (2013.01); *H04L 12/66* (2013.01); *H04Q 11/0005* (2013.01); *H04J 14/0267* (2013.01); *H04L 49/15* (2013.01); *H04Q 2011/009* (2013.01); *Y02D 10/14* (2018.01); *Y02D 10/151* (2018.01)

(58) Field of Classification Search
CPC ......... H04L 12/66; H04L 49/15; H04B 10/27; H04Q 11/0005; Y02D 10/14; Y02D 10/151

See application file for complete search history.

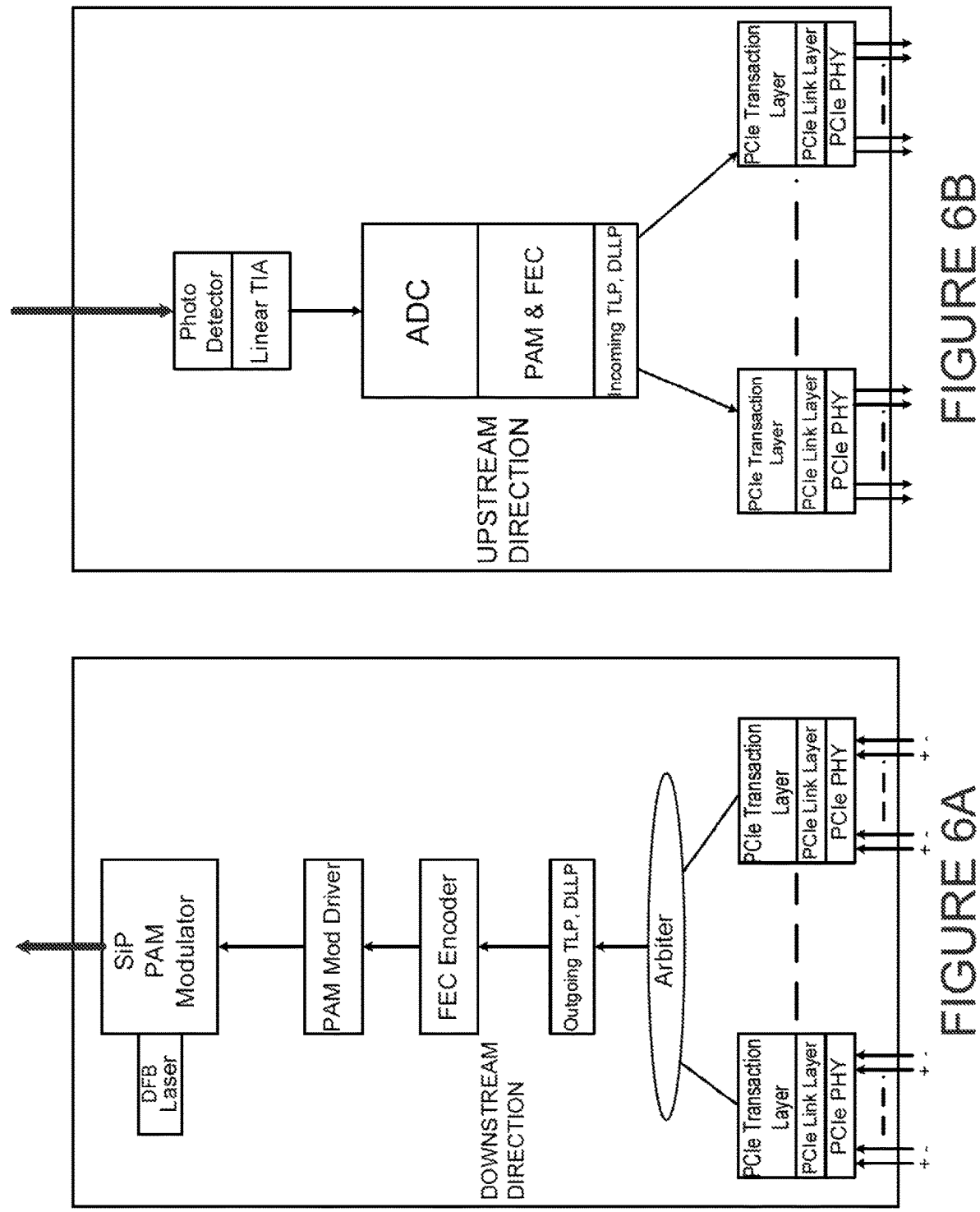

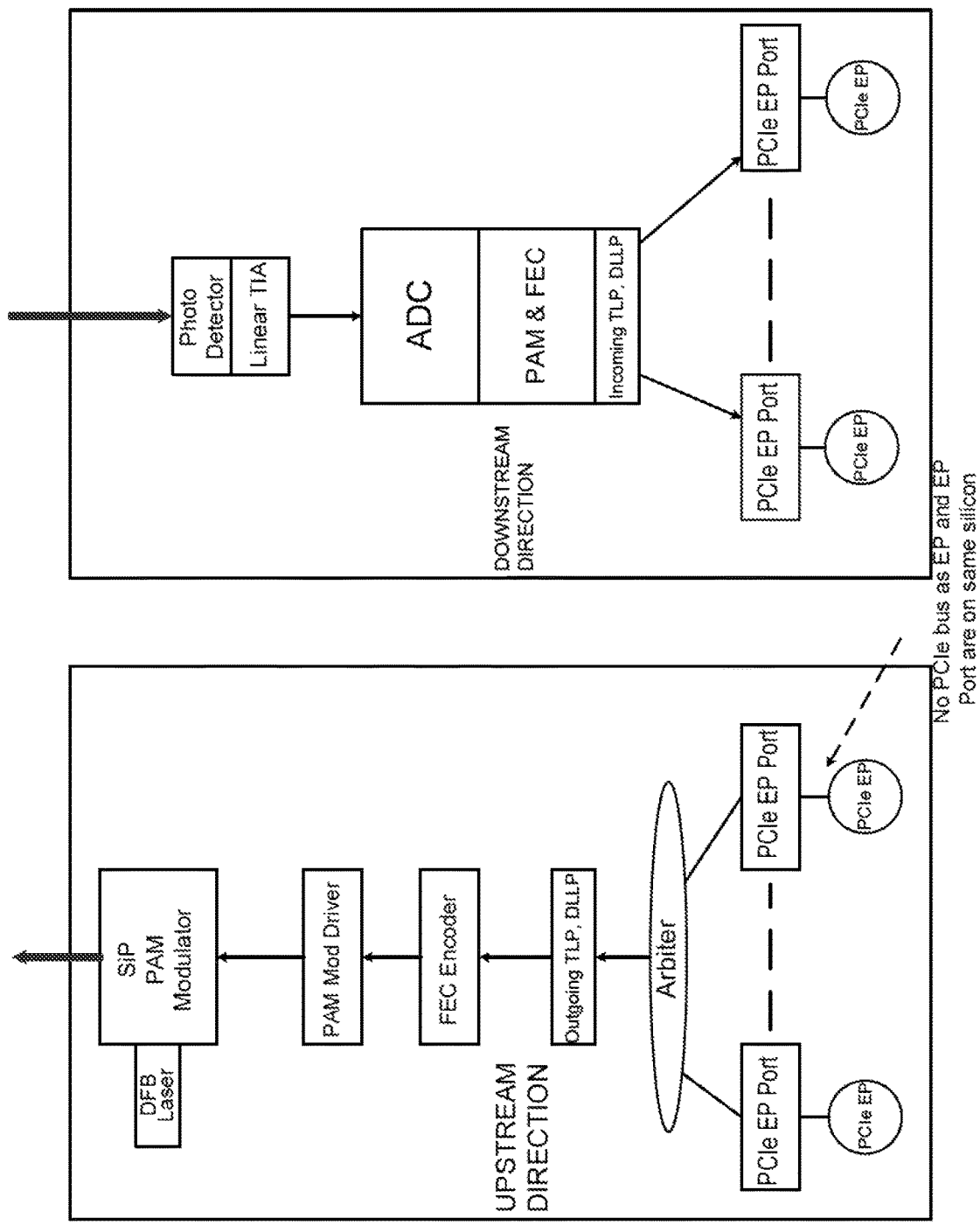

Note: The downstream aggregator and PCIe EP
can be integrated on the same silicon Aggregators are not exposed to SW i.e. no configuration space

PCIE LANE AGGREGATION OVER A HIGH SPEED LINK

CROSS REFERENCE PARAGRAPH

This application is a continuation of and incorporates by reference, for all purposes, U.S. patent application Ser. No. 15/812,493 filed Nov. 14, 2017, which is a continuation of U.S. patent application Ser. No. 15/223,412, filed Jul. 29, 2016, now U.S. Pat. No. 9,846,669 issued Dec. 19, 2017, which is a continuation of and claims priority to U.S. patent application Ser. No. 13/963,329, filed Aug. 9, 2013, now U.S. Pat. No. 9,430,437 issued Aug. 30, 2016, the entire contents of which are hereby incorporated.

BACKGROUND OF THE INVENTION

The present invention is directed to data communication systems and methods. More specifically, various embodiments of the present invention provide a computer network system configured for disaggregated I/O (input/output). A PCIe (Peripheral Component Interconnect Express) interface can be used, but can be others as well.

There is a growing trend in data centers to disaggregate I/O components and memory. I/O components such as NIC cards and HBA (host bus adapters) typically have a different cadence than CPU. Hence moving these I/O components out of the server box and into a central I/O appliance leads to better serviceability and reduced TCO (total cost of ownership). Further centralizing I/O resources coupled with virtualization can lead to better utilization of resources in a data center based on bandwidth requirements further leading to reduced costs. Disaggregating system memory is very beneficial for data center design as it allows for scaling memory capacity independent of the number of servers.

All of this however requires the need to cable buses such as PCI-Express or QPI (Quick Path Interconnect) over long distances. Such cabling leads to a lot of wires. An ×16 PCI Express for example has 64 wires. Further copper cabling has distance limitations. Hence a mechanism is needed to a) aggregate many serial lanes into few high speed lanes and b) transport the high speed bit stream reliably over long distances.

Over the past, there have been many types of communication systems and methods. Unfortunately, they have been inadequate for various applications. Therefore, improved communication systems and methods are desired.

BRIEF SUMMARY OF THE INVENTION

The present invention is directed to data communication system and methods. More specifically, various embodiments of the present invention provide a computer network system configured for disaggregated I/O (input/output). In certain embodiments, the communication interface is used by various devices within a spine-leaf network architecture, which allows large amount of data to be shared among servers. A PCIe (Peripheral Component Interconnect Express) interface can be used, but can be others as well.

In an embodiment, the present invention provides a computer network system. This system can be configured in a leaf-spine architecture and can include a router coupled to a network source, a plurality of core switches coupled to the router, a plurality of aggregator switches coupled to each of the plurality of core switches, and a plurality of rack modules coupled to each of the plurality of aggregator switches.

In an embodiment, each of the plurality of rack modules can include an I/O (Input/Output) Appliance having a network processor, a plurality of optical ports, a routing element coupled to the plurality of optical ports, a NIC (Network Interface Controller) interface coupled to the routing element, a downstream aggregator module coupled to the NIC, and a memory storage controller coupled to the downstream aggregator module. A top of rack switch can be coupled to each of the NIC interfaces, and a plurality of spine switches can be coupled to the top of rack switches.

Each of the rack modules can also include a plurality of server devices coupled to the I/O appliance. Each of the server devices can include a memory storage device, a CPU (Central Processing Unit) device, one or more memory modules coupled to the CPU device, and a PCIe (Peripheral Component Interconnect Express) interface configured with the CPU device. An upstream aggregator module can also be coupled to the plurality of server devices and can be provided on a back plane of the rack module. The upstream aggregator module can aggregate each of the PCIe interfaces of the plurality of server devices.

Many benefits are recognized through various embodiments of the present invention. The computer network system utilizing logical PCIe Aggregators with separate downstream and upstream aggregator modules can provide better utilization of resources and allows for scaling of memory capacity independent of the number of servers. The logical PCIe aggregators, including the downstream and upstream aggregators, can aggregated many serial lanes into one high speed lane and provide a high speed bit stream transport mechanism that can perform reliably over long distances. The transfer of PCIe packets is mainly discussed herein, but it would be recognized by those of ordinary skill in the art that the mechanisms described can be applied to other communications protocols as well.

BRIEF DESCRIPTION OF THE DRAWINGS

FIGS. 6A-6D are simplified block diagrams illustrating aggregator units according to various embodiments of the present invention.

DETAILED DESCRIPTION OF THE INVENTION

Figure 1:
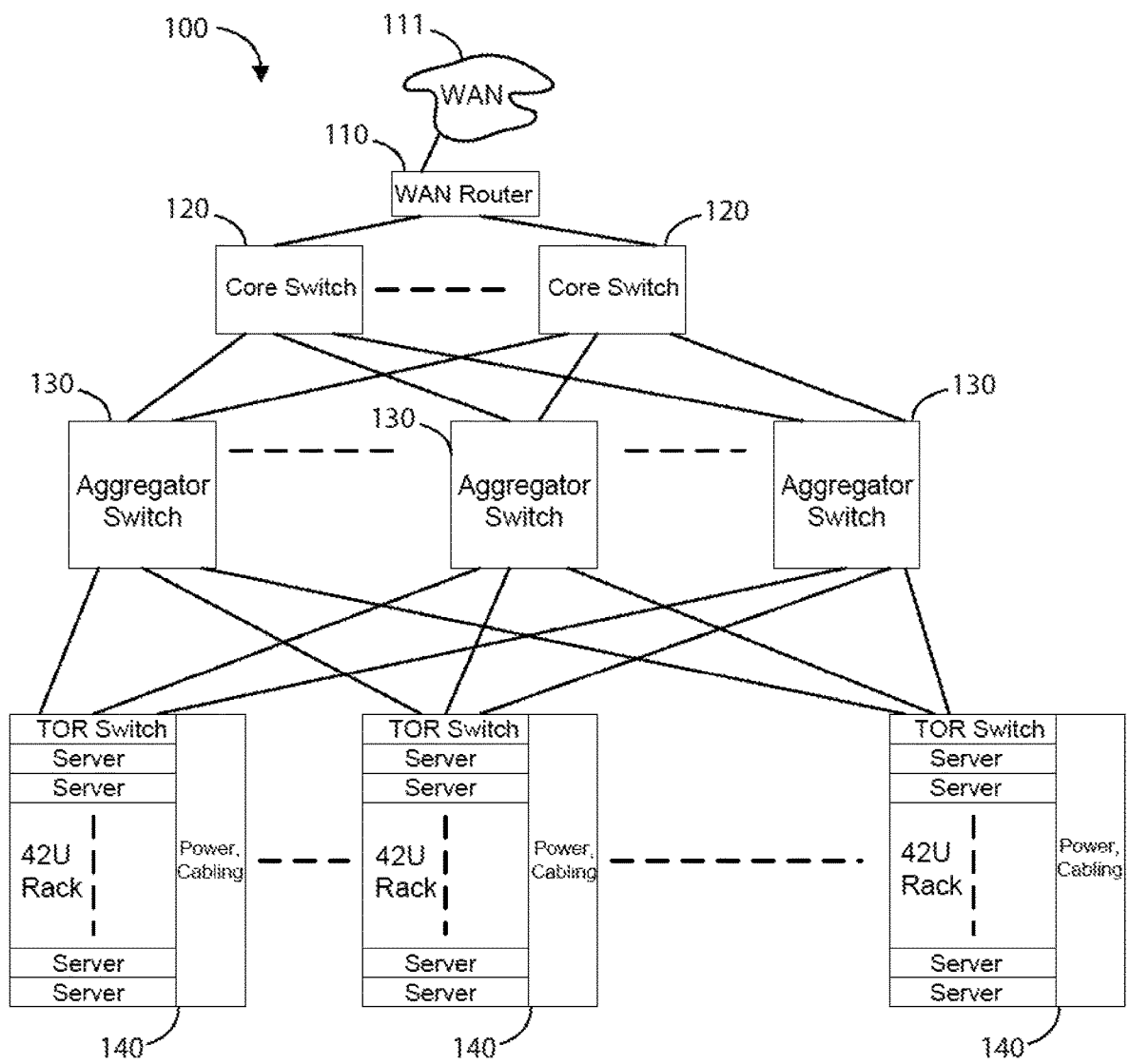
FIG. 1 is a simplified block diagram illustrating a computer network system according to an embodiment of the present invention.

The present invention is directed to data communication system and methods. More specifically, various embodiments of the present invention provide a computer network system configured for disaggregated I/O (input/output). In certain embodiments, the communication interface is used by various devices within a spine-leaf network architecture, which allows large amount of data to be shared among servers. A PCIe (Peripheral Component Interconnect Express) interface can be used, but can be others as well.

In the last decades, with advent of cloud computing and data center, the needs for network servers have evolved. For example, the three-level configuration that have been used for a long time is no longer adequate or suitable, as distributed applications require flatter network architectures, where server virtualization that allows servers to operate in parallel. For example, multiple servers can be used together to perform a requested task. For multiple servers to work in parallel, it is often imperative for them to be share large amount of information among themselves quickly, as opposed to having data going back forth through multiple layers of network architecture (e.g., network switches, etc.).

Leaf-spine type of network architecture is provided to better allow servers to work in parallel and move data quickly among servers, offering high bandwidth and low latencies. Typically, a leaf-spine network architecture uses a top-of-rack switch that can directly access into server nodes and links back to a set of non-blocking spine switches that have enough bandwidth to allow for clusters of servers to be linked to one another and share large amount of data.

In a typical leaf-spine network today, gigabits of data are shared among servers. In certain network architectures, network servers on the same level have certain peer links for data sharing. Unfortunately, the bandwidth for this type of set up is often inadequate. It is to be appreciated that embodiments of the present invention utilizes PAM (e.g., PAM8, PAM12, PAM16, etc.) in leaf-spine architecture that allows large amount (up terabytes of data at the spine level) of data to be transferred via optical network.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

In an embodiment, the computer network system can include disaggregated I/O by taking the I/O components out of the closed box and moving them to a central point in a rack module. This can help with upgrade cycles, since I/O components have different upgrade cycles compared to the CPU (Central Processing Unit), and reduce TCO (Total Cost of Ownership).

In order to take the PCIe components out of the closed box, these components need to have their reach extended to a few meters. Also, having the PCIe in the rack backplane increases the required cabling. In order to reduce the cabling and improve fidelity over long distances, several factors need to be addressed. Many PCIe links need to be consolidated into a pair of wires. The transport medium needs to be ensured to not increase bit error rate. The network system also needs to have robust error correction techniques.

FIG. 1 is a simplified block diagram illustrating a computer network system according to an embodiment of the present invention. As shown, the computer network system 100 includes a WAN (Wide Area Network) router 110 coupled to a WAN source 111 and one or more core switches 120. Each of the core switches can be coupled to one or more aggregator switches 130, which can be coupled to one or more rack structures 140. The system 100 can include a plurality of core switches 120, aggregator switches 130, and rack modules 140. Each of the core switches can be coupled to each member of the plurality of aggregator switches 130, and each of the aggregator switches can be coupled to each member of the plurality of rack modules 140. Those of ordinary skill in the art will recognize other variations, modifications, and alternatives.

In an embodiment, this computer network system utilizes a leaf-spine architecture. A leaf-spine architecture can include servers, leaf switches, and spine switches. In FIG. 1, the servers are rack modules including one or more servers, the leaf switches are the aggregator, switches and the spine switches are the core switches. It is to be appreciated that depending on the need and specific application, the number and arrangement of the servers and switches may be changed. As shown in FIG. 1, each server may be connected to more than one leaf switch. In a specific embodiment, a server is connected to a leaf/aggregator switch via optical communication link utilizing pulse amplitude modulation (PAM). PAM2, PAM4, PAM8, PAM12, PAM16, and/or other variations of PAM may also be used in conjunction with optical communication links in various embodiments of the present invention. The bandwidth of the optical communication link between the server/rack and leaf/aggregator switch can be over 10 gigabits/s. Each leaf switch may be connected to 10 or more servers. In one implementation, a leaf/aggregator switch has a bandwidth of at least 100 gigabits/s.

In a specific embodiment, a leaf switch comprises a receiver device configured to receive four communication channels, and each of the channels is capable of transferring incoming data at 25 gigabits/s and configured as a PAM-2 format. Similarly, a server (as shown within rack modules 140) can include a communication interface that is configured to transmit and receive at 100 gigabits/sec (e.g., four channels at 25 gigabits/s per channel), and is compatible with the communication interface of the leaf switches. The spine switches, similarly, comprise communication interfaces for transmitting and receiving data in PAM format. The spine switches may have a large number of communication channels to accommodate a large number of leaf switches, each of which provides switching for a large number of servers.

The leaf/aggregator switches are connected to spine/core switches. For example, one of the leaf/aggregator switches is connected to two spine/core switches. In a specific embodiment, each of the spine switches is configured with a bandwidth of 3.2 terabytes/s, which is big enough to communicate 32 optical communication links at 100 gigabits/s each. Depending on the specific implementation, other configuration and bandwidth are possible as well.

The servers, through the architecture 100 shown in FIG. 1, can communicate with one another efficiently with a high bandwidth. Optical communication links are used between servers and leaf switches, and also between leaf switches and spine switches, and PAM utilized for optical network communication.

It is to be appreciated that the PAM communication interfaces described above can be implemented in accordance with today communication standards form factors. In addition, afforded by high efficiency level, network transceivers according to embodiments of the present invention can have much lower power consumption and smaller form factor compared to conventional devices.

Figure 2:
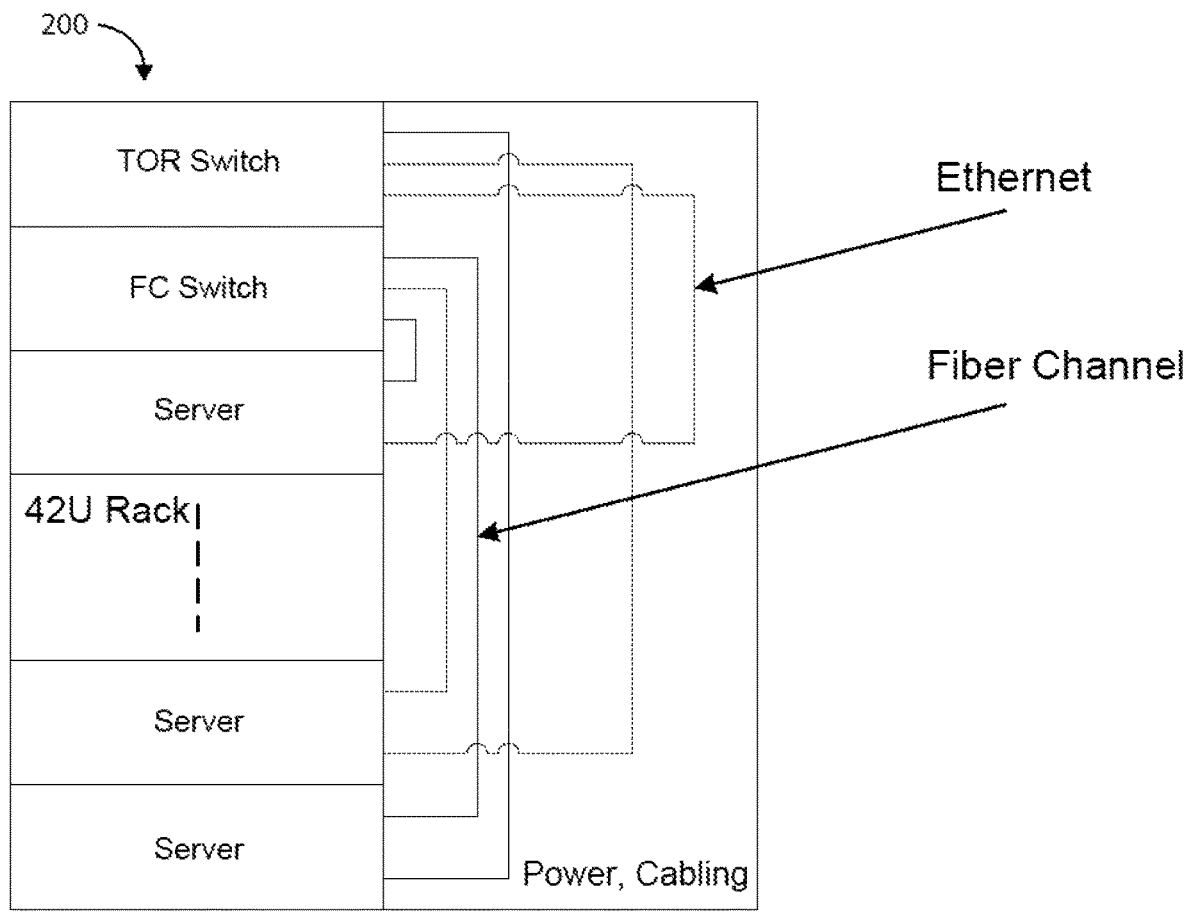
FIG. 2 is a simplified block diagram illustrating a rack module according to an embodiment of the present invention.

FIG. 2 is a simplified block diagram illustrating a rack module according to an embodiment of the present invention. This rack module 200 can be an example of the rack modules 140 shown in FIG. 1. As shown, the rack module 200 can include a TOR switch, an FC (Fiber Channel) switch, one or more servers, and one or more rack units. Any of one or more servers can be coupled to the TOR switch or the FC switch via one or more power lines or cabling. At least one of the servers is coupled to the TOR switch via an Ethernet cable and at least one of the servers is coupled to the FC switch via a fiber channel cable. In a specific embodiment, the rack module can include 42 rack units.

Figure 3:
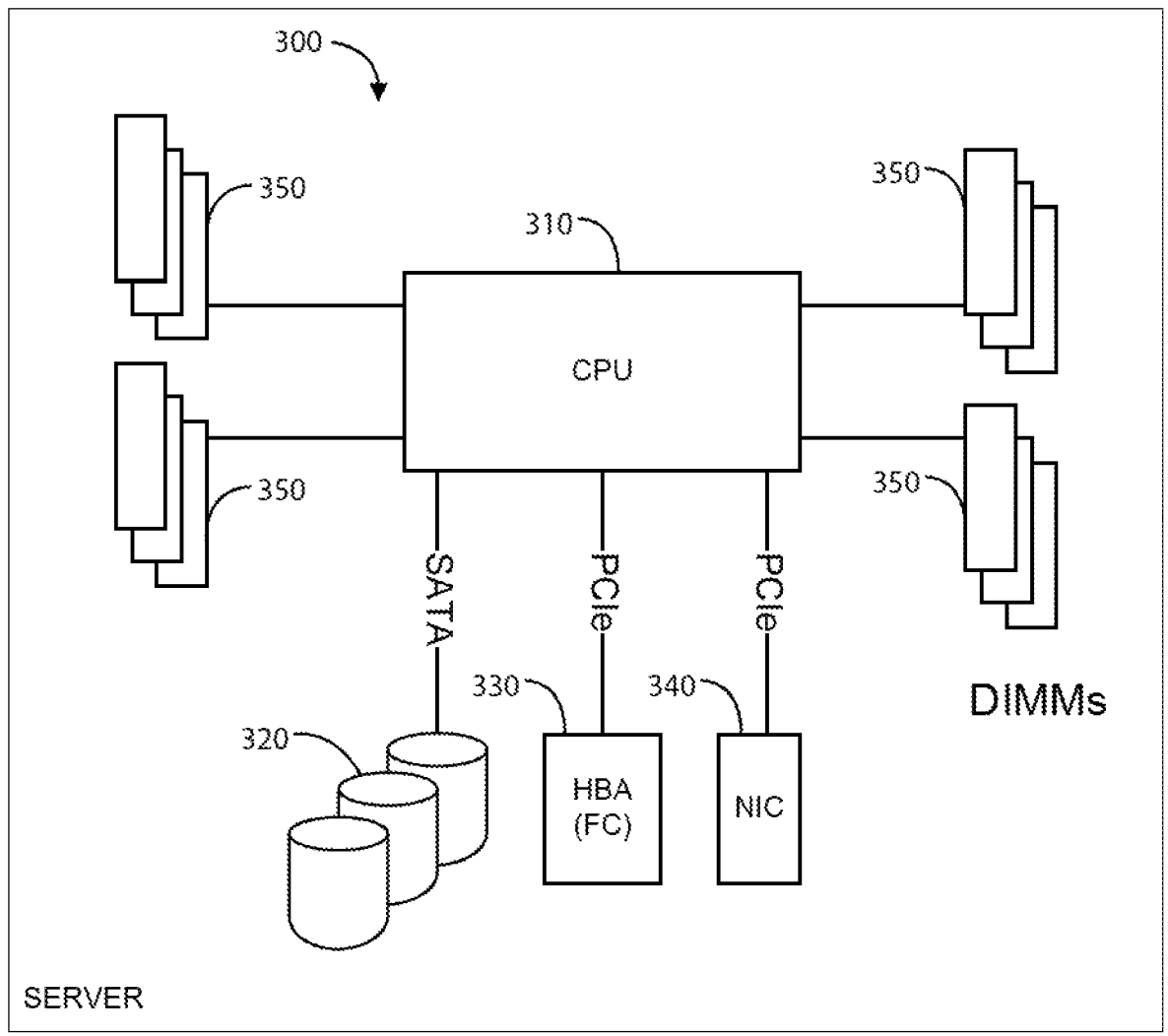
FIG. 3 is a simplified block diagram illustrating a server according to an embodiment of the present invention.

FIG. 3 is a simplified block diagram illustrating a server according to an embodiment of the present invention. This server 300 can be an example of the servers shown in FIG. 2. As shown, the server 300 can include a CPU coupled to one or more memory storage devices 320, a HBA (Host Bus Adapter) device 330, a NIC (Network Interface Controller) device 340, and one or more memory modules 350. In various embodiments, the HBA device 330 can be configured for FC applications or the like. The memory modules 350 can include DIMMs (Dual In-line Memory Modules) or the like. The HBA device 330 and the NIC device 340 can be coupled to the CPU 310 via a PCIe interface or the like, and the one or more memory storage devices 320 can be coupled to the CPU 310 via a SATA (Serial AT Attachment) interface or the like.

Figure 4:
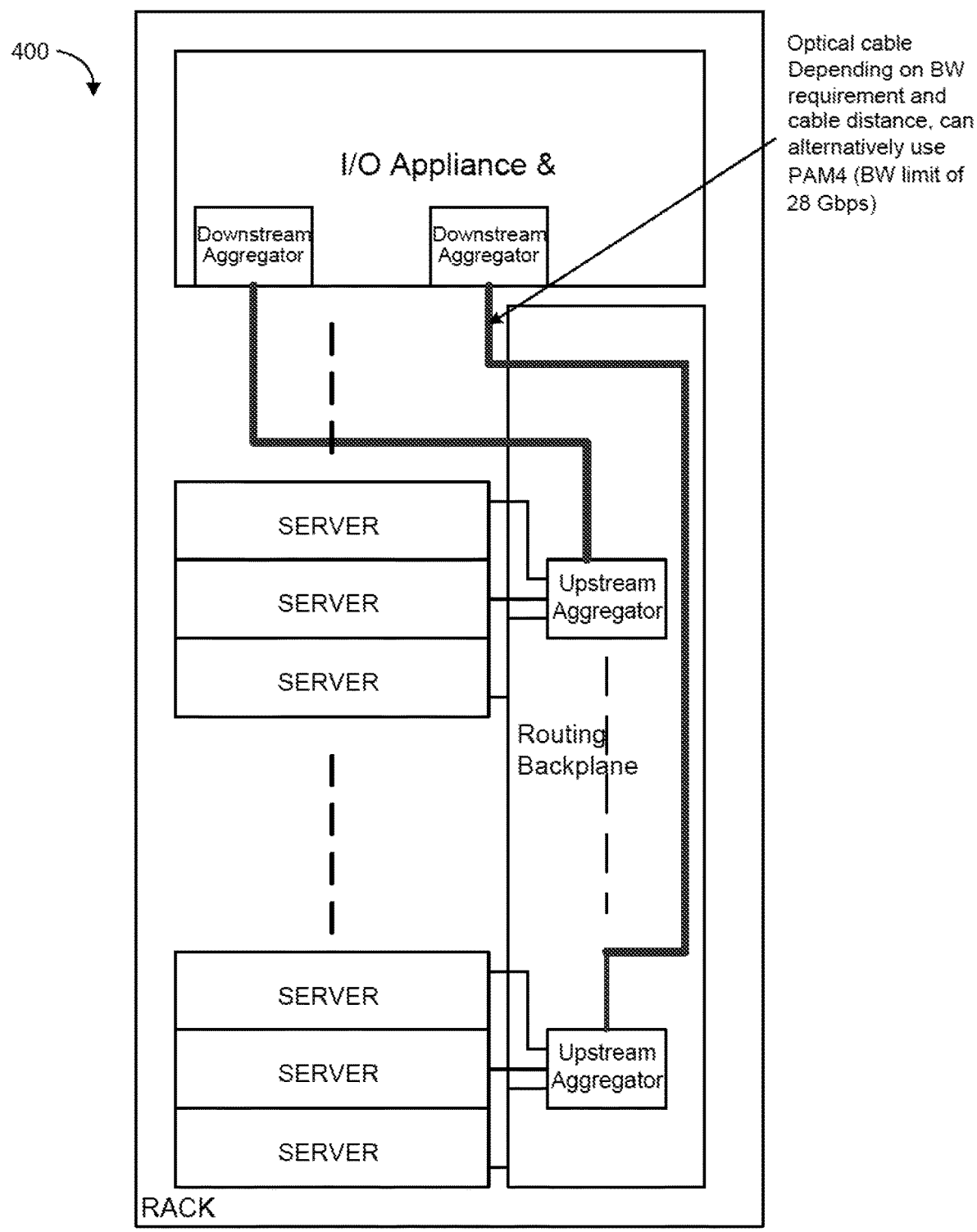
FIG. 4 is simplified block diagram illustrating a rack module with disaggregated I/O according to an embodiment of the present invention.

FIG. 4 is simplified block diagram illustrating a rack structure with disaggregated I/O according to an embodiment of the present invention. This rack module 400 can be another example of the rack modules 140 shown in FIG. 1. As shown, the rack 400 includes an I/O appliance, one or more downstream aggregator modules, one or more upstream aggregator modules, and one or more servers. In a specific embodiment, the I/O appliance can include the one or more downstream aggregator modules, which can be coupled to the one or more upstream aggregator modules via optical cables or the like. Depending on bandwidth requirement and cable distance, a PAM format or PAM4 format can be used (BW limit of 28 Gbps). The one or more upstream aggregator modules can be provided on a routing backplane and coupled to one or more of the server units.

Figure 5:
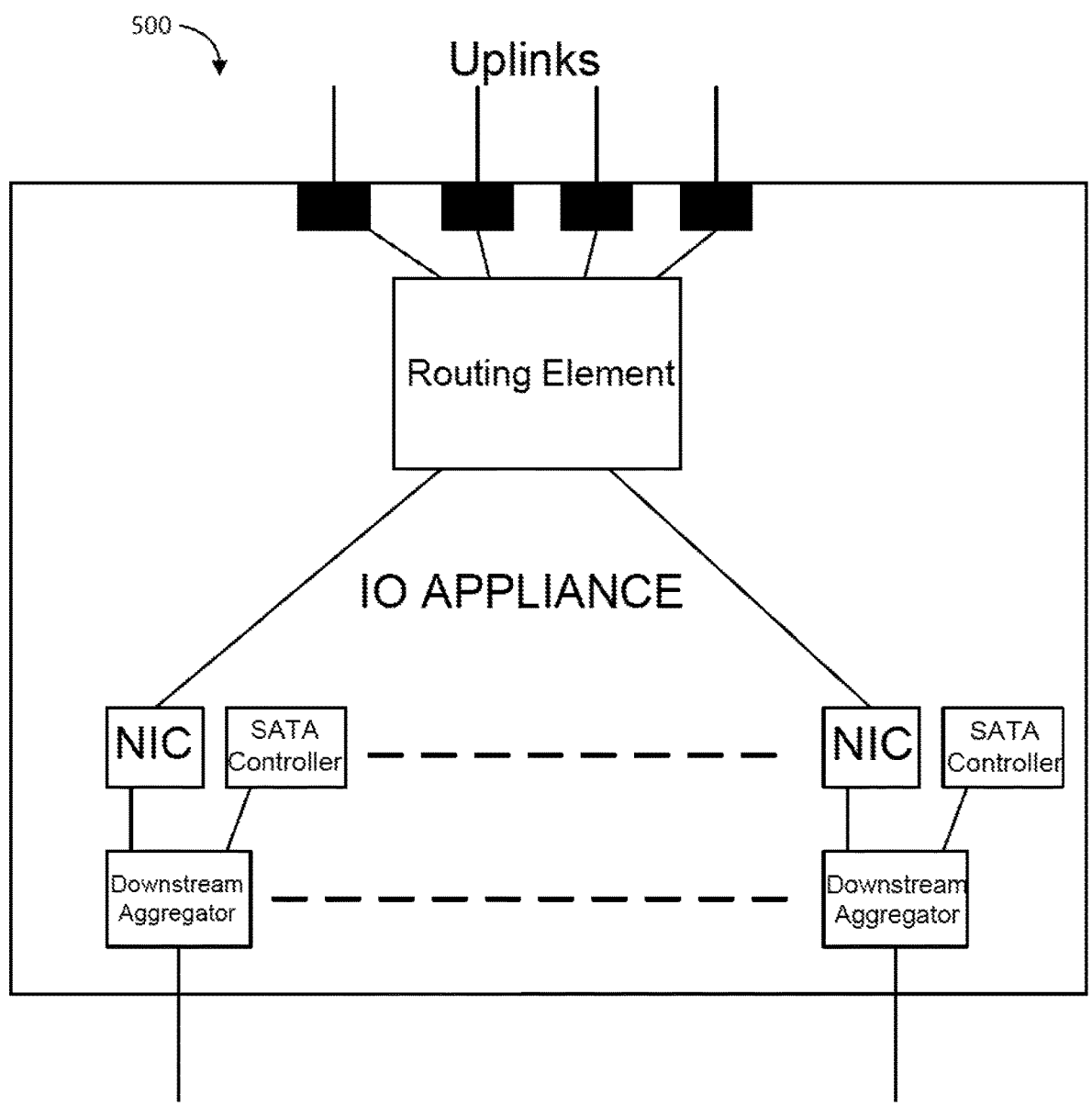
FIG. 5 is a simplified block diagram illustrating an I/O Appliance module according to an embodiment of the present invention.

FIG. 5 is a simplified block diagram illustrating an I/O appliance module according to an embodiment of the present invention. This I/O appliance module 500 can be an example of the I/O appliance shown in FIG. 4. As shown, the I/O appliance module 500 can include a routing element coupled to one or more uplinks. The routing element can be coupled to one or more NICs. The NICs can be coupled to one or more downstream aggregators, which can be coupled to one or more storage memory controllers, which can be SATA controllers or the like.

FIG. 6A-6D are simplified block diagrams illustrating aggregator modules according to various embodiments of the present invention. FIGS. 6A and 6B can represent an upstream aggregator module and FIGS. 6C and 6D can represent a downstream aggregator module.

FIG. 6A shows a downstream component of the upstream aggregator module that includes an arbiter module coupled in sequence to an outgoing TLP module, DLLP module, a FEC (Forward Error Correction) encoder, a PAM (Pulse-Amplitude Modulation) Mod driver, and a SiP (Session Initiation Protocol) PAM modulator coupled to a DFB (Distributed Feedback) laser. The Arbiter module is also coupled to one or more PCIe modules including a PCIe Transaction Layer module, a PCIe Link Layer module, and a PCIe PHY (physical layer) module. The PCIe modules can be coupled to one or more power sources.

FIG. 6B shows an upstream component of the upstream aggregator module that includes a first module including a photo detector and a linear TIA (Trans-impedance Amplifier) coupled to a second module including an ADC (Analog Digital Converter) and PAM & FEC module, and an incoming TLP, DLLP module. The second module can be coupled to one or more PCIe modules similar to those described for FIG. 6A.

FIG. 6C shows an upstream component of the downstream aggregator module that includes an arbiter module coupled in sequence to an outgoing TLP, DLLP module, a FEC encoder, a PAM Mod driver, and a SiP PAM modulator coupled to a DFB laser. The Arbiter module is also coupled to one or more PCIe downstream aggregators, each of which is coupled to a PCIe EP (End Point) module. In a specific embodiment, there is no PCIe bus as the EP and PCIe EP Port are on the same silicon.

FIG. 6D shows an downstream component of the upstream aggregator module that includes a first module including a photo detector and a linear TIA coupled to a second module including an ADC and PAM & FEC module, and an incoming TLP, DLLP module. The second module can be coupled to one or more PCIe modules similar to those described for FIG. 6C.

In various embodiments, aggregators used in the present system can use two different design approaches. These designs include the Pass Through approach (i.e. transparent to SW) and Switch Elements approach (i.e. visible to SW). In the Pass Through approach, DLLP (Data Link Layer Packets) and TLP (Transaction Layer Packets), and possibly other information, are sent via a high speed link. In the Switch Elements approach, the upstream aggregator is logically a PCIe switch upstream port and the downstream aggregator is logically a PCIe switch downstream port. Only the DLLP & TLP are sent via the high speed link in this approach. In a specific embodiment, the aggregators are transparent to SW. If required, the aggregators can be exposed to SW as PCIe switches.

Figure 7:
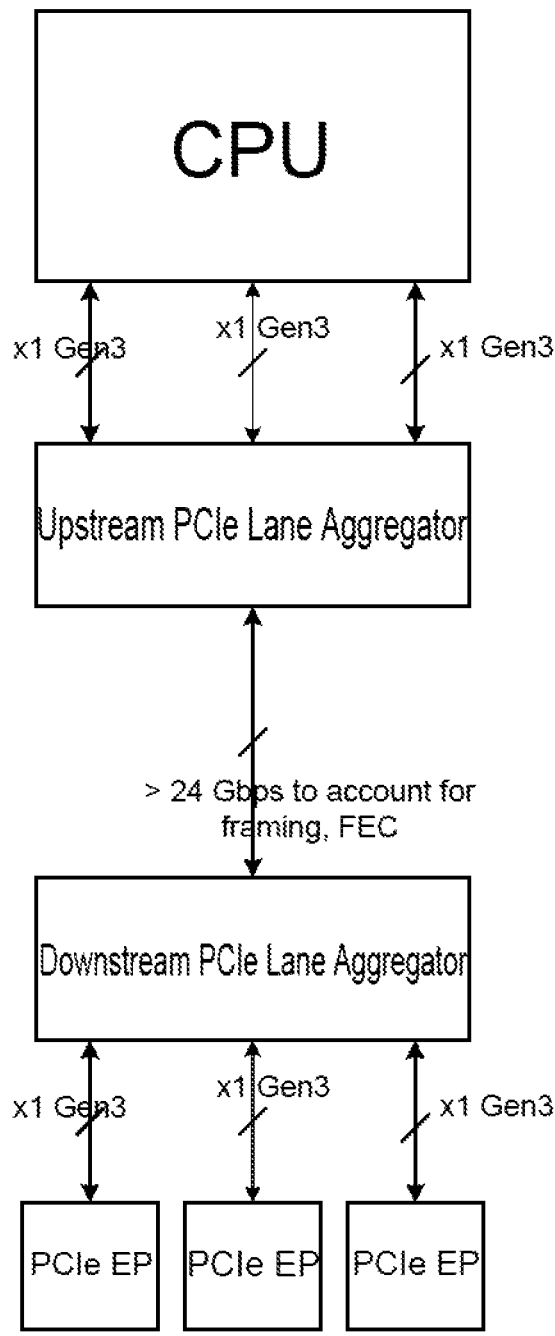
FIG. 7 is a simplified block diagram illustrating a computer network system with aggregation of ×1 PCIe Links according to an embodiment of the present invention.

FIG. 7 is a simplified block diagram illustrating a computer network system with aggregation of ×1 PCIe Links according to an embodiment of the present invention. This figure can represent an embodiment according to the Pass Through approach. As shown, a CPU is coupled in sequence to an Upstream PCIe Lane Aggregator, a Downstream PCIe Lane Aggregator, and one or more PCIe EP. In a specific embodiment, the downstream aggregator and PCIe EP can be integrated on the same silicon.

In an embodiment, the present invention can utilize technology to cable 28 Gbps over a few meters (about 3 meters). With this cable technology, the configuration shown can have the upstream and downstream aggregators as down components on the board. The links between the CPU and the upstream aggregator and between the downstream aggregator and the PCIe EP modules are shown to be ×1 Gen3 links, but can be others. Each of the 3 PCIe lanes can be connected to a TOP switch or an end point. In a specific embodiment, the clock frequency difference between RP and EP should be at most 600 ppm to meet spec requirements.

FIG. 7 depicts a mechanism to aggregate 3×1 PCIe links for transporting up to approximately 3 meters. The high speed link can use PAM4 (Pulse Amplitude Modulation-4 levels) to transport bits up to a few meters with very high fidelity. In this example, the reduction in cabling is from 12 wires (for 3×1 ports) to 4 wires (for the full duplex high speed link).

In an embodiment, this extension is achieved by the implementation of PCIe aggregators. As shown in FIG. 7, the PCIe aggregator is broken into two physical pieces of silicon: one for the upstream aggregator, one for the downstream aggregator. Further, both the upstream and downstream aggregators consolidate a number of switch ports into a component. In this example, three upstream switch ports are shown in the upstream aggregator and three downstream switch ports are shown in the downstream aggregator. There is a one-to-one mapping between the upstream ports and downstream ports achieved via straps or firmware. The upstream aggregator and downstream aggregator are located a few meters apart and are connected via a high speed serial link. Hence, the high speed link is logically resident inside the PCIe switch and is part of the internal switch fabric. The downstream aggregator can be integrated with other silicon components, such as the TOR switch, as well.

Additionally, the flow of packets between the aggregators is credit based and a retry mechanism is provisioned for in case the received packet encounters an error when transmitted on the high speed link. While the transfer rate on a ×1 PCIe Gen 3 is 8 Gbps, the transfer rate on the high speed link needs to be greater than 24 Gbps to account for additional framing, ACK/NACK, credit updates and forward error correction (FEC) techniques.

Figure 8:
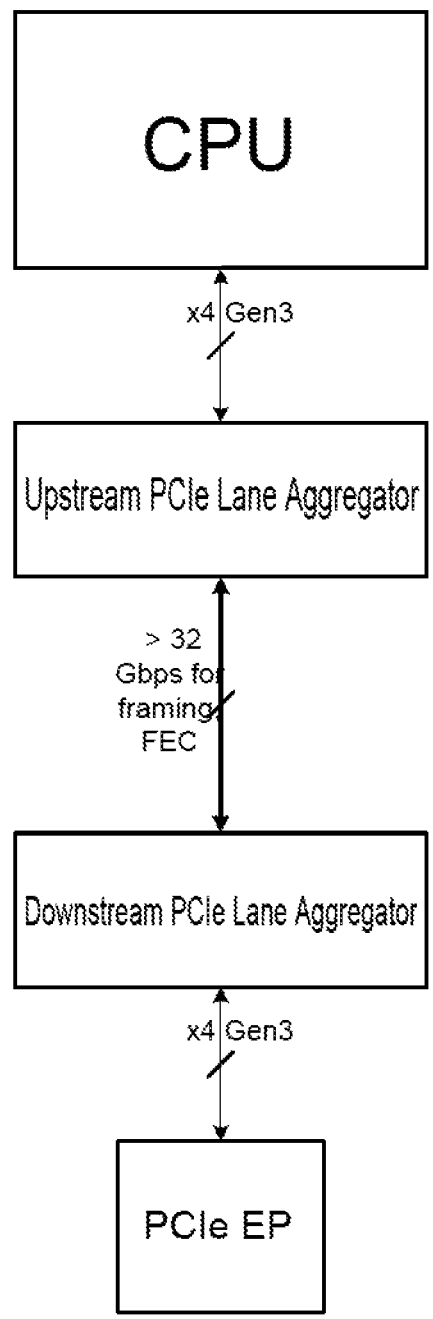
FIG. 8 is a simplified block diagram illustrating a computer network system with aggregation of greater than ×1 PCIe Links according to an embodiment of the present invention.

FIG. 8 is a simplified block diagram illustrating a computer network system with aggregation of greater than ×1 PCIe Links according to an embodiment of the present invention. This embodiment can represent another scenario according to the Pass Through approach. As shown, a CPU is coupled in sequence to an Upstream PCIe Lane Aggregator, a Downstream PCIe Lane Aggregator, and to a PCIe EP module. In a specific embodiment, the downstream aggregator and PCIe EP can be integrated on the same silicon. Here, the cabling between the aggregators may need to be optical type cables or require the use of PAM8 modulation over KR, or the like. This mechanism can be used for links greater than ×1. The only additional requirement is for a de-skew mechanism in the upstream and downstream aggregators. In this embodiment, the lanes between the CPU and the upstream aggregator and between the downstream aggregator and the PCIe EP module are ×4 Gen3 links. This scenario can aggregate four lanes. PLL modules used in this system can be configured to support 28G, 32G, and others.

Figure 9:
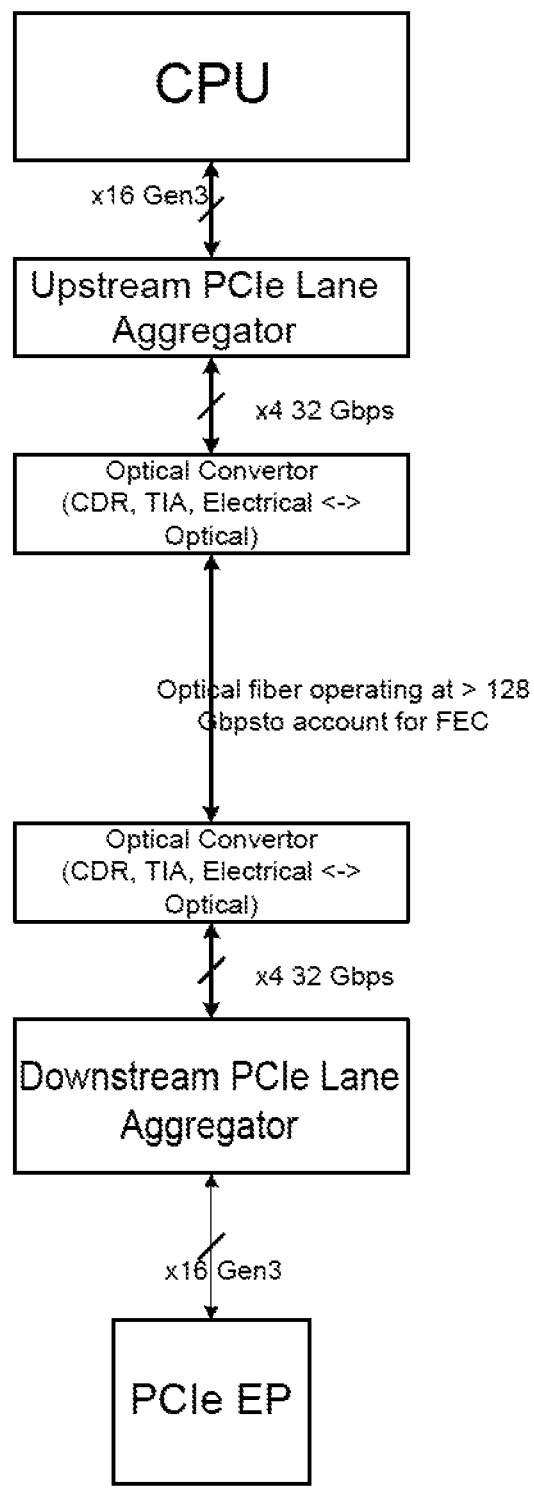
FIG. 9 is a simplified block diagram illustrating a computer network system with extended PCIe fabric according to an embodiment of the present invention.

FIG. 9 is a simplified block diagram illustrating a computer network system with extended PCIe fabric according to an embodiment of the present invention. Extending the cabling reach beyond a few meters (10 s of meters) requires the use of optics. As shown, the system includes a CPU connected in sequence to an Upstream PCIe Lane Aggregator, a first Optical Converter, a second Optical converter, a Downstream PCIe Lane Aggregator, and a PCIe EP module. The optical components bridge between ×4 32 Gbps links and an optical link where bits are transmitted at a rate greater than 128 Gbps. The aggregators in this example are required to handle the lane to lane de-skew due to transmission on the high speed 32 Gbps links as well as the optical cable.

In an embodiment, the PCIe switch functionality is used to provide for a long distance high speed cable. Unlike traditional switches, the PCIe switches depicted herein are not used for expanding the root hierarchy. In other worse, each logical switch has just one upstream port and one downstream port. This greatly simplifies the switch implementation in various embodiments of the present invention. The switch is designed with a full physical layer, a data link layer, and will expose a rich PCIe capability structure. However, there is no TLP processor or routing functionality required. All TLP received on the upstream port are just sent on the downstream port and vice-versa. Compared to the scenarios shown in FIGS. 7 and 8, this system can have extended PCIe fabric but can have increased loop latency due to optics, which can hurt performance. The Root Port (RP) and $3^{rd}$ party EP modules may not be tolerant of latency increases.

In various embodiments, the present system can provide for designs of many PCIe topologies. For example, the downstream aggregator can be connected to a traditional PCIe switch to provide for I/O expansion. By using a store and forward mechanism, the present implementation described previously can be easily adapted to other protocols for cable extension. QPI (QuickPath Interconnect) architecture is conceivably one example where system memory can be disaggregated using the previously outlined approach. Those of ordinary skill in the art will recognize other variations, modifications, and alternatives.

Figure 10:
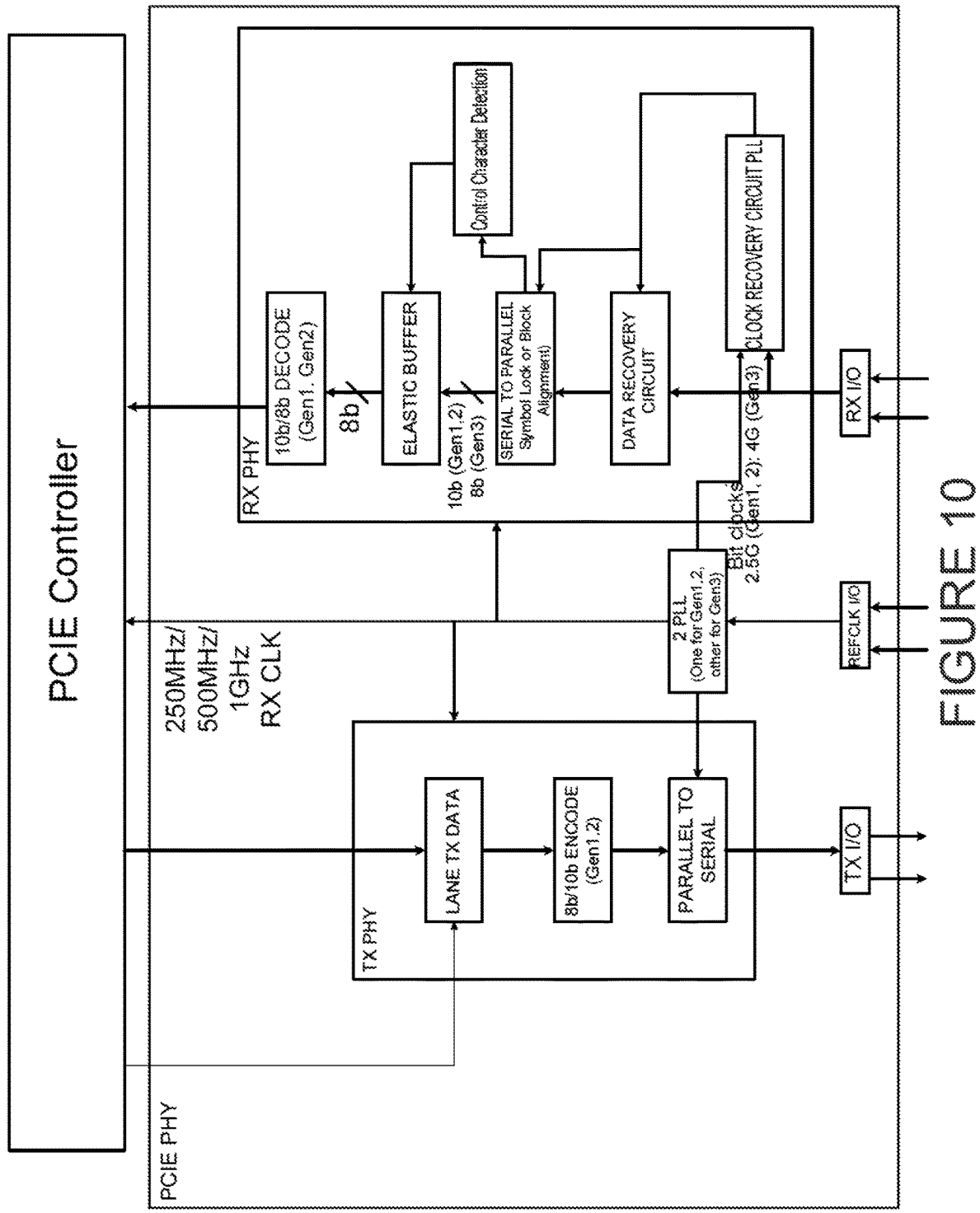
FIG. 10 is a simplified block diagram illustrating a PCIe PHY structure according to an embodiment of the present invention.

FIG. 10 is a simplified block diagram illustrating a PCIe PHY module according to an embodiment of the present invention. As shown, the PCIe PHY module is coupled to a PCIe controller and includes a TX PHY module, coupled to a TX I/O module, and an RX PHY module, coupled to an RX I/O module. A duo-PLL module having one PLL for Gen 1 & 2 and one PLL for Gen 3 is coupled to the RX PHY module, the TX PHY module, and the PCIe controller, as well as an REFCLK I/O module. The RX CLK line coupled to the PCIe controller, the TX PHY module, the RX PHY module, and the duo-PLL module can be configured for 250 MHz/500 MHz/1 GHz. Depending on the rate, a bit clock of 2.5G (Gen1/2) or 4G (Gen3) is required by the PCIe PHY receive and transmit paths.

In an embodiment, the TX PHY module includes a LANE TX DATA module coupled to the PCIe controller and an 8b/10b ENCODE (Gen 1, 2) module. The 8b/10b ENCODE module is also coupled to a parallel-to-serial module that is coupled to the TX I/O module. In an embodiment, the RX PHY module includes a Data Recovery circuit coupled to a Clock Recovery Circuit PLL module, both of which are coupled to the RX I/O module. The Data Recovery circuit is coupled in sequence to a serial-to-parallel module, an elastic buffer module, and a 10b/8b DECODE module, which is coupled to the PCIe controller. The serial-to-parallel module is also coupled to a Control Character Detection module, which is coupled to the elastic buffer.

Figure 11:
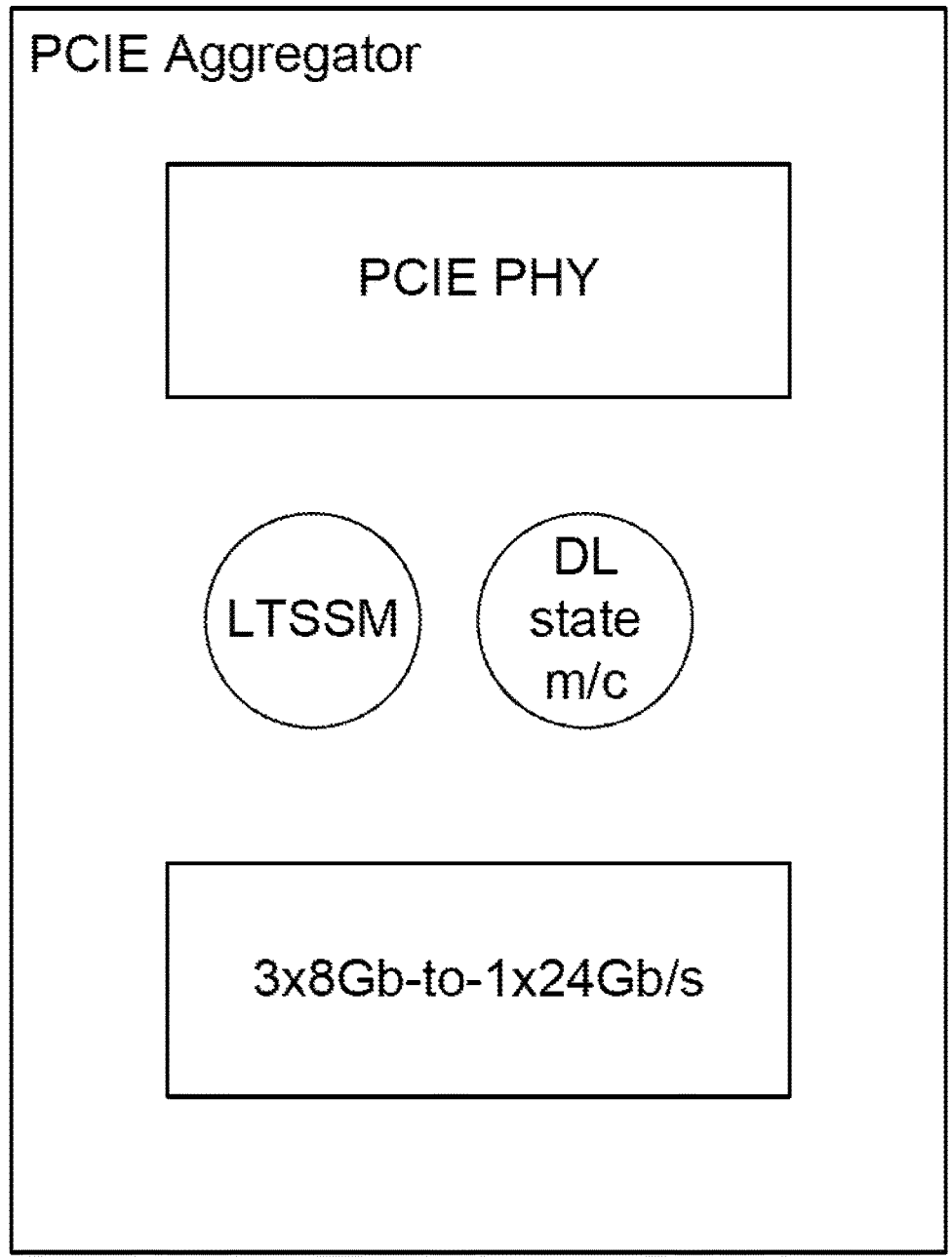
FIG. 11 is a simplified block diagram illustrating a PCIe Aggregator structure according to an embodiment of the present invention.

FIG. 11 is a simplified block diagram illustrating a PCIe Aggregator structure according to an embodiment of the present invention. As shown, the PCIe Aggregator includes a PCIe PHY module, an LTSSM (Link Training Status State Machine) module, a DL state m/c module, and a 3×8 Gb-to-1×24 Gb/s module. The DL state m/c can be configured for monitoring PM DLLP(S) to determine low power states of the link. In a specific embodiment, the PCIe aggregators are transparent to SW, but can be exposed to SW as a switch element in various embodiments.

In an embodiment, aggregators utilize an LTSSM module. The LTSSM in the upstream aggregator can be analogous to a PCIe switch upstream port and the one in the downstream aggregator can be analogous to a PCIe switch downstream port. The LTSSM module in the aggregator mimics the PCIe component on the other side of the high speed link. Additionally, the PHY module needs to know the rate (i.e. Gen1, Gen2, or Gen3) for clock data recovery and transmission at the appropriate bit rate. Referring to the examples shown in FIGS. 7-9, the LTSSM module can be used to mimic various components. The upstream component LTSSM is representative of the PCIe EP. The downstream component LTSSM is representative of the PCIe RP.

Figure 12:
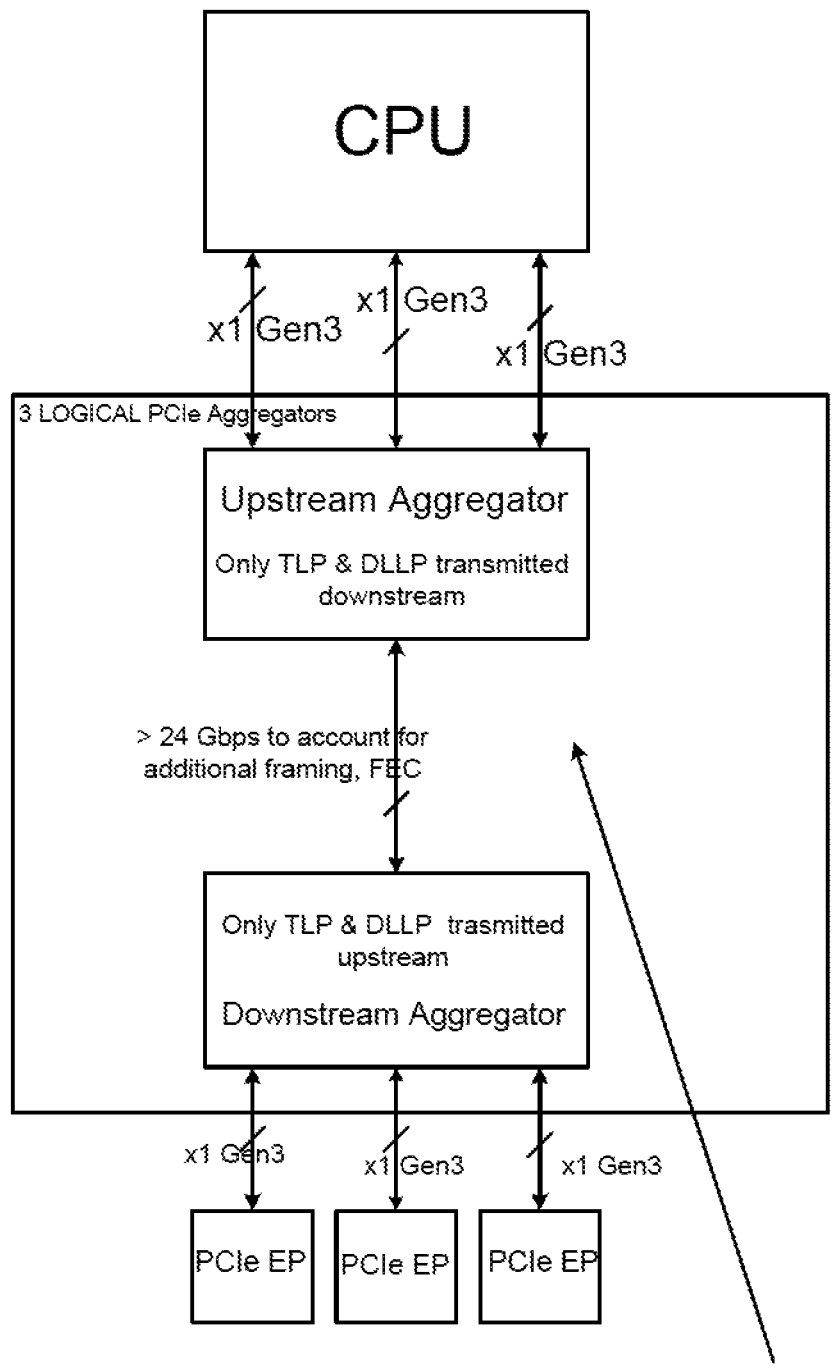
FIG. 12 is a simplified block diagram illustrating a PCIe aggregator structure according to an embodiment of the present invention.

FIG. 12 is a simplified block diagram illustrating a PCIe aggregator structure according to an embodiment of the present invention. This figure can represent a computer network system utilizing a Switch Elements approach. As shown, the computer network system includes a CPU coupled to 3 logical PCIe aggregators, which are coupled to one or more PCIe EP modules. The logical PCIe switch includes an upstream aggregator coupled to a downstream aggregator, which can transfer at a rate of greater than 24 Gbps to account for additional framing and FEC. The upstream aggregator only transmits TLP & DLLP downstream, and the downstream aggregator only transmits TLP & DLLP upstream. The upstream aggregator is coupled to the CPU via ×1 Gen3 links in this figure, but can be others. Similarly, the downstream aggregator is coupled to the PCIe EP modules via ×1 Gen3 links, but can be others as well.

As described in the other embodiments, the downstream aggregator and the PCIe EP modules can be integrated on the same silicon. In this embodiment, there is a static 1:1 mapping between the upstream switch port and downstream switch port. Each EP is only discovered through 1 RP. As shown, the flow of packets between the aggregators is protected by FEC and is credit based. In an embodiment, a port can be a multi-lane link, and when transmitting across a multi-lane link (e.g. 4×32) the TLP and DLLP should be stripped.

This implementation of the computer network system provides a clean architecture. The challenges of the PCIe link, such as clocking PPM, lane-to-lane deskew, etc., can be neatly handled by the aggregators. The high speed optical links do not have any of these requirements. Loop latency issues can be handled by buffering in the aggregators, and this system can be developed using the PCIe switch design of the present invention.

In an embodiment, the present invention provides a computer network system utilizing a mechanism to transport data packets over a high speed link. The system can include an I/O appliance, a plurality of server devices coupled to the I/O appliance, and an upstream aggregating silicon photonics device coupled to the plurality of server devices. The I/O appliance can be provided on a top rack spatial location within the computer network system. In a specific embodiment, a twisted pair can be configured between the PCIe and the upstream aggregating silicon photonics. These upstream aggregating silicon photonics devices can include the upstream aggregator modules discussed previously for FIGS. 6C and 6D.

The I/O appliance includes a network processor and a plurality of optical ports numbered from 1 to N. The I/O appliance also includes a downstream aggregating silicon photonics device provided on each of the plurality of optical ports and a SSD (Solid-State Drive) interface and a NIC (Network Interface Controller) interface coupled to each of the optical ports. A top rack switch is coupled to each of the NIC interfaces and a plurality of spine switches are coupled to the top of rack switches. The downstream aggregating silicon photonics device can include the downstream aggregator modules discussed previously.

The plurality of server devices can each include a memory storage device, a CPU (central processing unit) device coupled to the memory storage device using a DDR (Double Data Rate) interface, and a PCIe interface configured with the CPU device. Furthermore, the upstream aggregating silicon photonics device can aggregate each of the PCIe interfaces. In a specific embodiment, the system can include a twisted pair configured between the PCIe interfaces and the upstream aggregating silicon photonics device. The PCIe interface can be configured to communicate at 8 Gbps and can be configured in a PAM format (PAM4, PAM8, PAM12, etc.).

It is to be appreciated that embodiments of the present invention provide numerous benefits and advantages over existing techniques. Among other things, the spine-leaf architecture combined with PAM formats used in optical communication links, servers within this architecture can share large amount of data quickly and efficiently, thereby allowing improved virtualization and collaboration of servers compared to existing systems.

For example, a communication interface according to an embodiment of the present invention provides 1.2 Tb/s of bandwidth. In a specific embodiment, the present invention provides 3.2 Gb/s or higher bandwidth. A single spine server can have 32 ports configured at 100 Gb/s each. In addition, the PAM-based optical communication interface as described in various implementations of the present invention are energy efficient, with a power consumption of about 3 W compared to 12 W of power consumption of a similarly specified conventional system. For example, a communication interface according to the present invention can be integrated with other components, thereby reducing the total size.

There are many other benefits as well. The computer network system utilizing logical PCIe aggregators with separate downstream and upstream aggregator modules for disaggregated I/O can provide better utilization of resources and allows for scaling of memory capacity independent of the number of servers. The logical PCIe aggregators, including the downstream and upstream aggregators, can aggregated many serial lanes into one high speed lane and provide a high speed bit stream transport mechanism that can perform reliably over long distances. The transfer of PCIe packets is mainly discussed herein, but it would be recognized by those of ordinary skill in the art that the mechanisms described can be applied to other communications protocols as well.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A computer network system comprising:
   an I/O appliance having a downstream aggregating silicon photonics device provided on each of a plurality of optical ports numbered from 1 to N; and
   a plurality of server devices coupled to the I/O appliance, each of the server devices comprising a PCIe (Peripheral Component Interconnect Express) interface, and an upstream aggregating silicon photonics device coupled to the plurality of server devices and aggregating each of the PCIe interfaces.

2. The system of claim 1 further comprising a twisted pair configured between the PCIe interfaces and the upstream aggregating silicon photonics device.

3. The system of claim 1 wherein the downstream aggregating silicon photonics device and the upstream aggregating silicon photonics device are configured in a 1-to-1 mapping.

4. The system of claim 1 wherein a high-speed link is configured between the downstream aggregating silicon photonics device and the upstream aggregating silicon photonics device.

5. The system of claim 4 further comprising a pair of optical converters coupled by an optical fiber configured between the upstream aggregating silicon photonics device and the downstream aggregating silicon photonics device.

6. A computer network system comprising:
   a router coupled to a network source;
   a plurality of core switches coupled to the router;
   a plurality of aggregator switches coupled to each of the plurality of core switches; and
   a plurality of rack modules coupled to each of the plurality of aggregator switches, wherein each of the plurality of rack modules comprises:
   an I/O appliance having a downstream aggregating silicon photonics device provided on each of a plurality of optical ports numbered from 1 to N; and
   a plurality of server devices coupled to the I/O appliance, each of the server devices having a PCIe (Peripheral Component Interconnect Express) interface, and an upstream aggregator module coupled to the plurality of server devices and aggregating each of the PCIe interfaces.

7. The system of claim 6 wherein the downstream aggregator module is coupled to one or more PCIe EP (End Point) modules; and wherein the downstream aggregator module and the one or more PCIe EP modules are integrated on a silicon material.

8. The system of claim 6 wherein the downstream aggregator module and the upstream aggregator module are configured in a 1-to-1 mapping.

9. The system of claim 6 wherein a high-speed link is configured between the downstream aggregator module and the upstream aggregator module.

10. The system of claim 9 further comprising a pair of optical converters coupled by an optical fiber configured between the upstream aggregator module and the downstream aggregator module; and wherein the computer network system is configured in a leaf-spine architecture.

11. A method of operating a computer network system having an I/O appliance, a plurality of server devices coupled to the I/O appliance, and an upstream aggregating silicon photonics device coupled to the plurality of server devices; the method comprising:
   receiving, by a plurality of optical ports of the I/O appliance numbered from 1 to N, a data stream;
   aggregating, by a downstream aggregating silicon photonics device of the I/O appliance provided on each of the plurality of optical ports, the data stream;
   processing, by a Peripheral Component Interconnect Express (PCIe) interface of each server device, the data stream; and
   aggregating, by the upstream aggregating silicon photonics device, each of the PCIe interfaces to aggregate the data stream.

12. The method of claim 11, wherein aggregating each of the PCIe interfaces includes aggregating via a twisted pair configuration between the PCIe interfaces and the upstream silicon photonics device.

13. The method of claim 11, wherein the downstream aggregating silicon photonics device and the upstream aggregating silicon photonics device are configured in a 1-to-1 mapping.

14. The method of claim 11 further comprising communicating, by a high-speed link configured between the downstream aggregating silicon photonics device and the upstream aggregating silicon photonics device, the data stream.

15. The method of claim 14 further comprising converting, by a pair of optical converters coupled by an optical fiber configured between the upstream aggregating silicon photonics device and the downstream aggregating silicon photonics device, the data stream.

16. A method of operating a computer network system a router coupled to a network source, a plurality of core switches coupled to the router, a plurality of aggregator switches coupled to each of the plurality of core switches, and a plurality of rack modules coupled to each of the plurality of aggregator switches, each of the rack modules including an Input/Output (I/O) appliance, a plurality of server devices coupled to the I/O appliance, and an upstream aggregator module coupled to the plurality of service devices; the method comprising:
   receiving, by a plurality of optical ports of the I/O appliance numbered from 1 to N, a data stream;

aggregating, by a downstream aggregator module of the I/O appliance provided on each of the plurality of optical ports, the data stream;

processing, by a Peripheral Component Interconnect Express (PCIe) interface of each server device, the data stream; and aggregating, by the upstream aggregator module, each of the PCIe interfaces to aggregate the data stream.

17. The method of claim 16 further comprising configuring, by one or more PCIe End Point (EP) modules coupled to the downstream aggregator module; the data stream; and wherein the downstream aggregator module and the one or more PCIe EP modules are integrated on a silicon material.

18. The method of claim 16 wherein the downstream aggregator module and the upstream aggregator module are configured in a 1-to-1 mapping.

19. The method of claim 16 further comprising communicating, by a high-speed link configured between the downstream aggregator module and the upstream aggregator module, the data stream.

20. The method of claim 19 further comprising converting, by a pair of optical converters coupled by an optical fiber configured between the upstream aggregator module and the downstream aggregator module, the data stream.

* * * * *